US010101540B2

(12) United States Patent
Gregorski

(10) Patent No.: US 10,101,540 B2
(45) Date of Patent: Oct. 16, 2018

(54) ASYMMETRIC OPTICAL FIBER WEDGE FOR CORE POSITIONING

(71) Applicant: Corning Optical Communications LLC, Hickory, NC (US)

(72) Inventor: Steven Joseph Gregorski, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 107 days.

(21) Appl. No.: 15/285,753

(22) Filed: Oct. 5, 2016

(65) Prior Publication Data

US 2017/0176692 A1 Jun. 22, 2017

Related U.S. Application Data

(60) Provisional application No. 62/268,583, filed on Dec. 17, 2015.

(51) Int. Cl.
*G02B 6/38* (2006.01)
*G02B 6/26* (2006.01)

(52) U.S. Cl.
CPC ......... *G02B 6/3834* (2013.01); *G02B 6/3843* (2013.01); *G02B 6/3851* (2013.01); *G02B 6/262* (2013.01); *G02B 6/3831* (2013.01); *G02B 6/3895* (2013.01)

(58) Field of Classification Search
None
See application file for complete search history.

(56) References Cited

U.S. PATENT DOCUMENTS

| 4,146,300 | A | * | 3/1979 | Kaiser | G02B 6/3843 |
|---|---|---|---|---|---|
| | | | | | 385/67 |
| 4,205,896 | A | | 6/1980 | Borsuk | |
| 4,763,980 | A | | 8/1988 | Gerber et al. | |
| 5,018,819 | A | | 5/1991 | Schmidt | |
| 6,694,076 | B2 | | 2/2004 | Crafts | |
| 6,715,932 | B2 | | 4/2004 | Kuroha et al. | |
| 6,731,849 | B1 | | 5/2004 | Singh et al. | |
| 6,742,936 | B1 | | 6/2004 | Knecht et al. | |

(Continued)

FOREIGN PATENT DOCUMENTS

| JP | 2004126371 A | 4/2004 |
|---|---|---|
| WO | 2015068122 A1 | 5/2015 |

OTHER PUBLICATIONS

PCT International Search Report, dated Nov. 10, 2015, 3 pages.
(Continued)

*Primary Examiner* — Chad H Smith
(74) *Attorney, Agent, or Firm* — Adam R. Weeks

(57) ABSTRACT

A portion of a core of an optical fiber may be positioned eccentrically in a bore of a ferrule. The portion of the core may be part of an asymmetric cross-sectional region of the optical fiber, and the asymmetric cross-sectional region may include an asymmetric outer surface. The asymmetric outer surface may include an inclined portion spaced outwardly from the portion of the core in a first direction. There may be contact between the inclined portion and the ferrule, so that a lengthwise axis of the portion of the core is spaced apart from a lengthwise axis of the bore in a second direction, and the first and second directions extend substantially opposite from one another.

24 Claims, 11 Drawing Sheets

(56) References Cited

U.S. PATENT DOCUMENTS

| | | |
|---|---|---|
| 7,209,375 B2 | 4/2007 | Gimbel et al. |
| 8,132,971 B2 | 3/2012 | Luther et al. |
| 9,144,917 B1 | 9/2015 | Gregorski |
| 2006/0171638 A1 | 8/2006 | Dye |

OTHER PUBLICATIONS

Yu-Kuan Lu et al "Asymmetric elliptic-cone-shaped microlens for efficient coupling to high power laser diodes references and links" Jounrla of Lightwave Technology, Optical Fiber Communication Confrence 14, pp. 1313-1318 (1990).

Molew, "Beam shaping integrated features energy coupling reshaping the world of optical fiber end tips" 2013, retrieved from URL: http://rhu103.sma-promail.com/SQLImages/kelmscott/Molex/PDF_Images/987650-8940.pdf.

International Search Report and Written Opinion PCT/US2016/055501 dated Jan. 20, 2017.

* cited by examiner

ASYMMETRIC OPTICAL FIBER WEDGE FOR CORE POSITIONING

PRIORITY APPLICATION

This application claims the benefit of priority under 35 U.S.C. § 119 of U.S. Provisional Application Ser. No. 62/268,583 filed on Dec. 17, 2015, the content of which is relied upon and incorporated herein by reference in its entirety.

BACKGROUND

This disclosure generally relates to optical fibers and, in one aspect, to methods and systems for tuning optical fiber interfaces.

Optical fibers are useful in a wide variety of applications, including the telecommunications industry for voice, video, and data transmissions. In a telecommunications system that uses optical fibers, there are typically many locations where the optical fibers connect to equipment or other optical fibers. To conveniently provide these connections, fiber optic connectors are often provided on the ends of fiber optic cables.

A fiber optic connector typically includes a ferrule with one or more bores that receive one or more optical fibers. The ferrule supports and positions the optical fiber(s) with respect to a housing of the fiber optic connector. For example, when the housing of the fiber optic connector is mated with another component, an optical fiber in the ferrule can be positioned in a known, fixed location relative to the housing. This allows an optical communication to be established when the optical fiber is aligned with another suitably positioned optical fiber provided in the mating component.

Each bore of the ferrule in a fiber optic connector typically extends to a front of the ferrule. With such a design, an optical fiber can be inserted into and passed through the ferrule. As an example, after securing the optical fiber relative to the ferrule (e.g., by using a bonding agent in the bore), an optical surface may be formed on the optical fiber at the front of the ferrule. At this optical surface, sometimes the position of the core of the optical fiber may not be within industry specifications, which can negatively impact optical communication by causing insertion loss.

SUMMARY

One embodiment of this disclosure relates to a method of at least partially forming an optical interface comprising an optical fiber and a ferrule, wherein the method comprises eccentrically positioning a portion of a core of the optical fiber in a bore of the ferrule. The portion of the core may be part of an asymmetric cross-sectional region of the optical fiber, and the asymmetric cross-sectional region may include an asymmetric outer surface. The asymmetric outer surface may extend asymmetrically around the portion of the core. The asymmetric outer surface may include an inclined portion spaced outwardly from the portion of the core in a first direction. The eccentrically positioning of the portion of the core may be comprised of there being contact between the inclined portion and the ferrule, so that a lengthwise axis of the portion of the core is spaced apart from a lengthwise axis of the bore in a second direction, and the first and second directions extend substantially opposite from one another. The contact between the inclined portion and the ferrule may be sliding contact between the inclined portion and the ferrule, so that the portion of the core moves in the second direction in response to the sliding contact. The first and/or second direction may be selected to decrease insertion loss.

The eccentrically positioning of the portion of the core may be comprised of causing relative movement between the asymmetric cross-sectional region and the bore along the lengthwise axis of the bore while the optical fiber extends through the bore, and the contact between the inclined portion and the ferrule may occur at least partially in response to the relative movement between the asymmetric cross-sectional region and the bore. The causing of the relative movement between the asymmetric cross-sectional region and the bore may be comprised of pulling the optical fiber so that the asymmetric cross-sectional region moves at least farther into the bore.

The method may further include substantially aligning the first and/or second direction with a predetermined feature of the optical interface. The optical interface may be a fiber optic connector, and the predetermined feature may be a key, or other suitable feature, of the fiber optic connector.

The asymmetric cross-sectional region may be at least partially formed while the optical fiber extends through the bore. The forming of the asymmetric cross-sectional region may comprise asymmetrically heating the asymmetric cross-sectional region.

The method may further comprise positioning the bore of the ferrule within a predetermined tuning region. The first direction may be selected so that the portion of the core is positioned in a predetermined target zone after the eccentrically positioning of the portion of the core in the bore, wherein, the predetermined target zone is at least partially defined relative to a datum point, and wherein the predetermined tuning region is at least partially defined relative to the datum point.

An embodiment of this disclosure relates to a fiber optic apparatus comprising an optical fiber and a ferrule. An asymmetric cross-sectional region of the optical fiber has an asymmetric outer surface that extends asymmetrically around a portion of a core of the optical fiber. The asymmetric outer surface includes an inclined portion spaced outwardly from the portion of the core in a first direction. The asymmetric cross-sectional region is at least partially positioned in a bore of the ferrule so that the portion of the core is at least partially positioned in the bore, and the inclined portion is in contact with the ferrule. At least the bore and the inclined portion may be cooperatively configured so that a lengthwise axis of the portion of the core is spaced apart from a lengthwise axis of the bore in a second direction, and the first and second directions extend substantially opposite from one another. The first and/or second directions may be substantially aligned with a predetermined feature of the fiber optic apparatus. The fiber optic apparatus may be a fiber optic connector, and the predetermined feature may be a key, or other suitable feature, of the fiber optic connector.

The inclined portion of the asymmetric outer surface may be a first inclined portion, and the asymmetric outer surface may further include a second inclined portion positioned oppositely from the first inclined portion. As compared to the second inclined portion, the first inclined portion may have a greater slope, or may otherwise protrude farther outwardly from the portion of the core.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, one aspect of this disclosure is the provision of a method of at least partially forming an optical interface, wherein the method includes one or more tuning steps that seek to decrease insertion loss of the optical interface.

Figure 1:
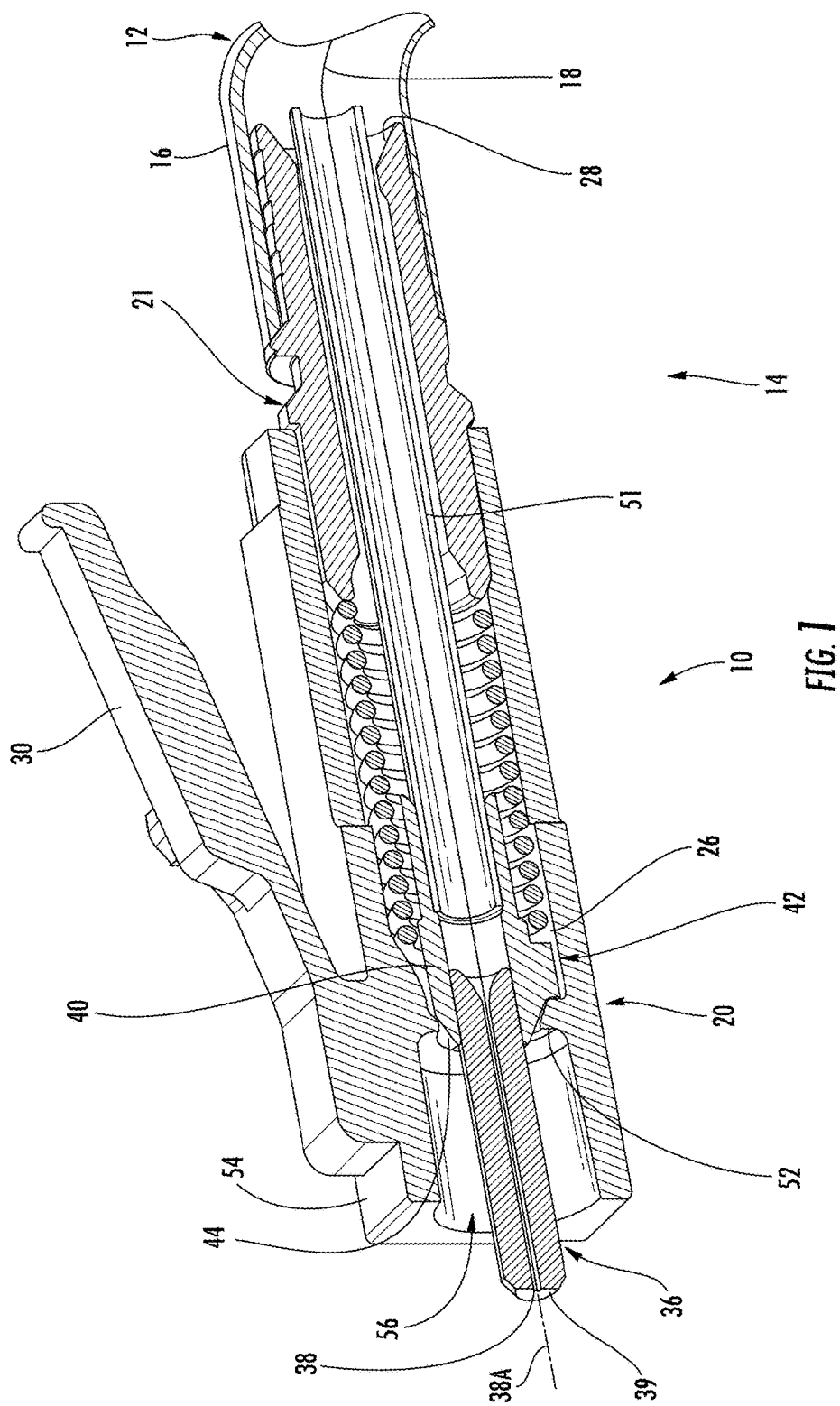
FIG. 1 is a perspective, cross-sectional view of an example of a fiber optic cable assembly including a fiber optic connector, in accordance with an embodiment of this disclosure.

Referring to FIG. 1, and very generally described, an example of a method of forming an optical interface may include wedging an eccentric bulge of an optical fiber 18 in a bore 38 of a ferrule 36 so that a core of the optical fiber is located in a predetermined (e.g., tuned) eccentric position in the bore. The predetermined eccentric position of the core of the optical fiber 18 may be selected to decrease insertion loss of the optical interface. The method of forming the optical interface may further include configuring (e.g., tuning) the ferrule 36/bore 38. For example, the bore 38 may be eccentrically positioned in a predetermined manner relative to one or more associated structural features of the optical interface. The predetermined eccentric position of bore 38 may be selected to decrease insertion loss of the optical interface. In addition, the selecting of the predetermined eccentric position of core of the optical fiber 18 and the selecting of the predetermined eccentric position of bore 38 may be coordinated in a manner that further decreases insertion loss of the optical interface. As an example, and not for the purpose of limiting the scope of this disclosure, the optical interface may comprise an apparatus such as a fiber optic connector 10.

Figure 2:
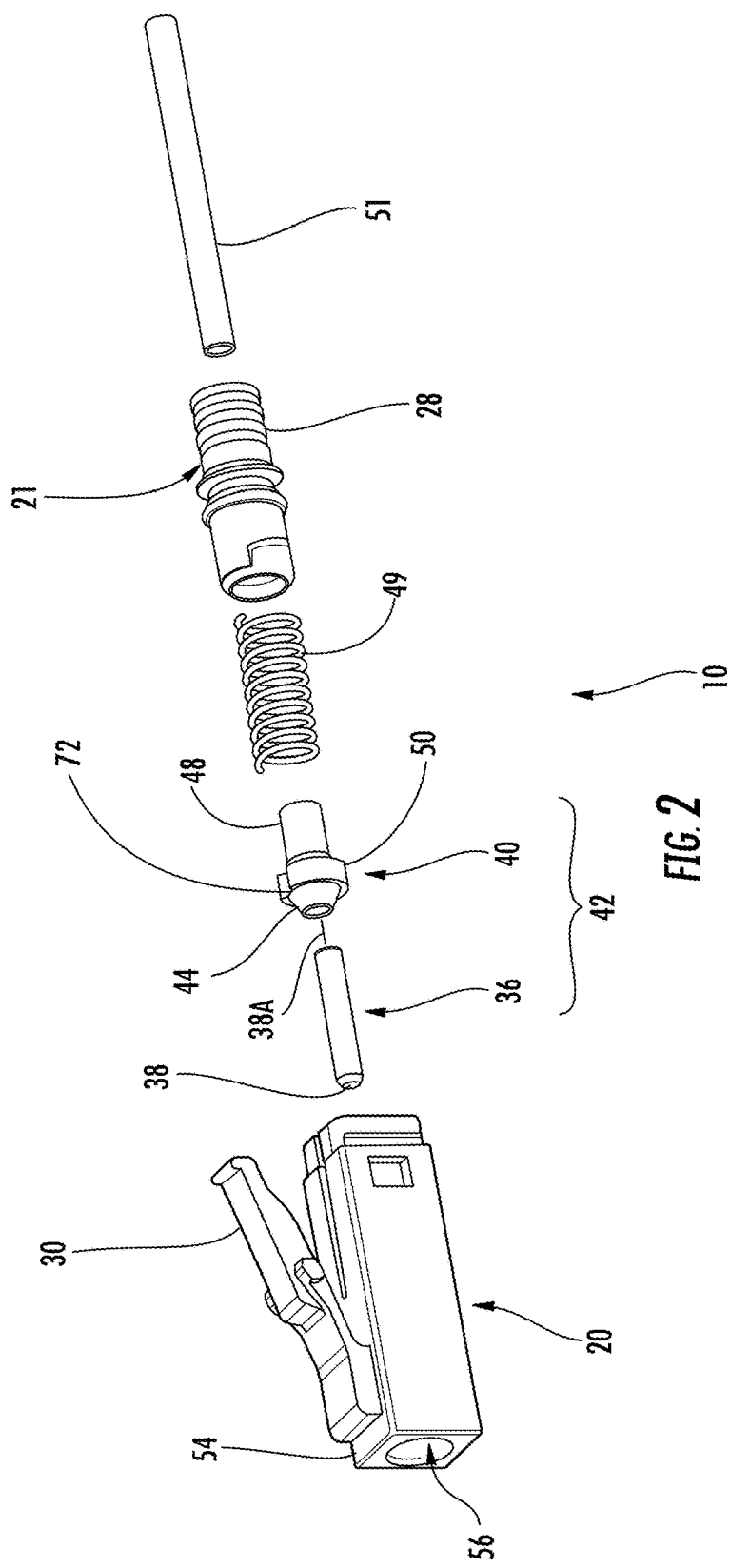
FIG. 2 is an exploded perspective view of the fiber optic connector of FIG. 1.

An example of the fiber optic connector 10 is shown in FIGS. 1 and 2. Whereas only one type of fiber optic connector is shown in the drawings of this disclosure (specifically, an LC fiber optic connector), those of ordinary skill in the art will understand that aspects of this disclosure may be used in conjunction with or otherwise associated with any suitable type of fiber optic connector, including SC, ST, or MPO type fiber optic connectors, and/or other single-fiber or multi-fiber fiber optic connectors, or the like. In the following, a general discussion of the fiber optic connector 10 is followed by a further discussion of methods and systems for tuning positions of the core of the optical fiber 18 and the ferrule 36 and/or bore 38.

As shown in cross-section in FIG. 1, the fiber optic connector 10 may be installed on a fiber optic cable 12 to form a fiber optic cable assembly 14. FIG. 1 also shows that the fiber optic cable 12 can have a jacket 16 surrounding the optical fiber 18. FIG. 2 shows the fiber optic connector 10 in an exploded configuration. Referring to FIGS. 1 and 2, the fiber optic connector 10 includes a housing 20 and a sleeve 21 connected to a rear end of the housing. The sleeve 21 may include a nipple or retention member 28 formed integrally with or attached to a rear end of the sleeve, for at least partially facilitating connection with the fiber optic cable 12. The housing 20 has an internal passage 26 extending therethrough, and at least a portion of the passage may be generally cylindrical or polygonal in shape, or any other suitable shape. An exterior of the housing 20 may have any suitable shape, such as a shape consistent with fiber optic connectors known in the art, for mating with existing fiber optic communication components, such as ports of adapters, or the like. The housing 20 may also include a fastener 30, such as a flexible latching arm, for the purpose of securing the housing 20 to an existing fiber optic communication component, such as a port of an adapter, or the like.

As shown in FIGS. 1 and 2, the ferrule 36 has a bore 38 ("ferrule bore") configured to support the optical fiber 18. The ferrule 36 further includes an outer end face 39 ("ferrule end face"). When the fiber optic connector 10 and optical fiber 18 are fully assembled together and ready for use as an optical interface, a cleaved end of the optical fiber may be substantially coplanar with the ferrule end face 39.

The ferrule 36 may extend from a ferrule holder 40. The ferrule 36 and ferrule holder 40 may be combined into a single structure in some embodiments. For convenience, the term "ferrule assembly," designated by reference numeral 42, may be used to refer to the combination of the ferrule 36 and ferrule holder 40, regardless of whether the ferrule and ferrule holder are separate components secured together or different portions of a single structure. Even as separate components, the ferrule 36 and ferrule holder 40 are typically fixed in position relative to one another.

The ferrule holder 40 is configured to reside substantially within the passage 26 of the housing 20. Referring to FIG. 2, the ferrule holder 40 has an outer segment 44 (or "first segment" or "front segment") from which the ferrule 36 extends. The outer segment 44 may have a frustoconical peripheral shape, or any other suitable shape. The ferrule holder 40 further includes an inner segment 48 (or "second segment" or "rear segment"), shown with a cylindrical periphery. An outer flange 50 (or "intermediate segment") may extend from the periphery of the ferrule holder 40 and define the boundary between the outer segment 44 and inner segment 48. A rear surface of the outer flange 50 may engage a front end of a compression spring 49 that extends around the inner segment 48.

The spring 49 may also extend around an optional lead-in tube 51. The lead-in tube 51 may extend from the inner segment 48 and reside substantially within the passage 26 of the housing 20. The optical fiber 18 may extend through the lead-in tube 51, through the ferrule holder 40, and into the ferrule 36 to which the optical fiber is mounted. The spring 49 may be positioned in the passage 26 of the housing 20 such that a rear end of the spring is engaged against an internal shoulder of the housing and such that the spring biases the ferrule assembly 42 forwardly.

The housing 20 of the fiber optic connector 10 further includes an annular inner flange 52 configured to contact the outer segment 44 of the ferrule holder 40 to arrest or restrict forward movement of the ferrule assembly 42, so that the ferrule holder is substantially retained within the passage 26 of the housing 20. This movement-restricting contact between the inner flange 52 and ferrule assembly 42 will be discussed in greater detail below. The housing 20 may include an outer portion 54 having a hole 56 extending therethrough, wherein the ferrule 36 extends through the hole 56.

Typically after the optical fiber 18 is mounted to the ferrule 36, as will be discussed in greater detail below, the fiber optic connector 10 may be partially assembled by positioning the ferrule assembly 42 within the passage 26 of the housing 20, so that the outer segment 44 of the ferrule assembly faces forwardly.

In another embodiment, as an example for at least partially facilitating quadrant tuning, as will be discussed in greater detail below, the outer segment 44 of the ferrule holder 40 may be chamfered to create a series of forwardly facing, angled abutment surfaces (not shown). The angled abutment surfaces may be oblique to a lengthwise axis 38A (or "bore axis 38A") of the ferrule bore 38. The angled abutment surfaces may taper inwardly in a forward direction, toward the forward end of the ferrule 36, so that the outer segment 44 is generally in the shape of a truncated four-sided pyramid having four angled abutment surfaces. For cooperatively engaging the angled abutment surfaces, the inner flange 52 may be chamfered to create a series of rearwardly facing, angled mating surfaces (not shown). The angled mating surfaces may correspond in number to the angled abutment surfaces of the ferrule holder 40. The angled mating surfaces may also be oriented to match the orientation of the angled abutment surfaces. Accordingly, the angled mating surfaces may be oblique to a centerline of the hole 56 and passage 26. The above-discussed movement-restricting contact between the inner flange 52 and ferrule assembly 42 may be provided by contact between the angled abutment and mating surfaces (not shown, and respectively of the housing 20 and ferrule assembly 42).

The housing 20, ferrule assembly 42, and angled abutment and mating surfaces (not shown, and respectively of the housing 20 and ferrule assembly 42) may also be configured so that angled mating surface(s) can contact respective angled abutment surface(s) in a face-to-face manner in at least two rotational positions of the ferrule assembly 42 relative to the housing 20 for aligning, adjusting and/or tuning the position of the ferrule bore 38, as will be discussed in greater detail below. The angled abutment and mating surfaces (respectively of the housing 20 and ferrule assembly 42) may be generally referred to as predetermined features of the fiber optic connector 10, and they may also be referred to as and/or respectively configured as keys and slots, or other suitable aligning features. Accordingly, the angled abutment and mating surfaces are not limited to the configurations discussed above.

Figure 3:
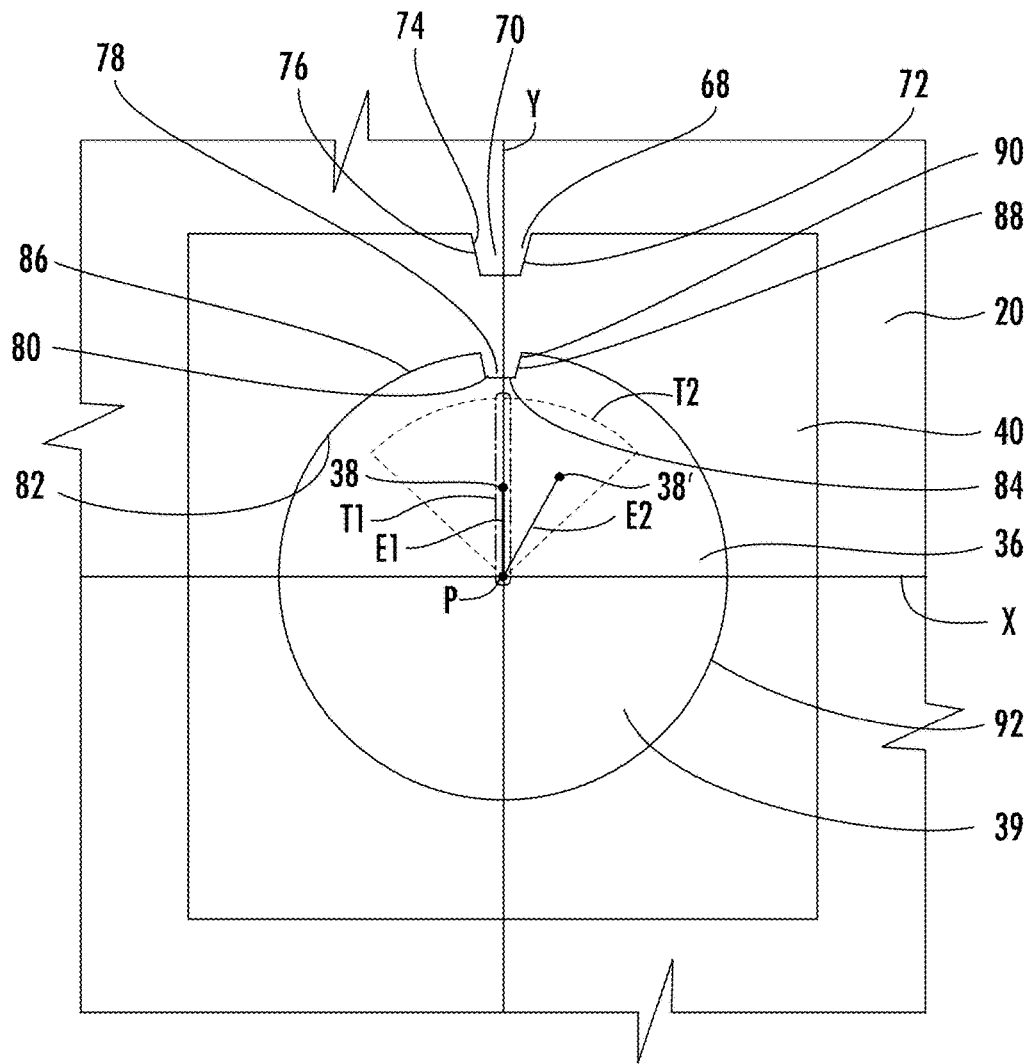
FIG. 3 is an enlarged, schematic, front elevation view of a portion of the fiber optic connector of FIG. 1, wherein a coordinate system and greatly enlarged examples of tuning regions are superimposed on an end face of a ferrule.

In addition or as an alternative to the angled abutment and mating surfaces, keys and slots, or other suitable aligning features, may be included in the fiber optic connector 10, such as for at least indirectly aligning, adjusting, and/or tuning the position of the ferrule bore 38. For example, as shown in FIG. 3, the housing 20 may include at least one housing key 68 that includes, or is in the form of, one or more protrusions 70 extending inwardly from an inner surface of the housing 20. Each protrusion 70 may be configured to cooperatively engage within a slot, indentation, or notch 72 (FIGS. 2 and 3) defined in an outer surface of the ferrule holder 40, so that an outer surface 74 of the protrusion is substantially aligned with and engages an interior surface 76 of the respective notch 72.

FIG. 3 also shows that, when formed separately, the ferrule holder 40 and ferrule 36 may have complementary features configured for aligning, adjusting and/or tuning the position of the ferrule bore 38. For example, the ferrule holder 40 may include at least one ferrule key 78 that includes, or is in the form of, one or more protrusions 80 extending inwardly into a passage 82 of the ferrule holder 40. The substantially cylindrical passage 82 of the ferrule holder 40 is configured to at least partially receive and house at least a portion of the ferrule 36. The protrusion 80 may be received within at least one slot, indentation, or notch 84 formed along an otherwise substantially or generally cylindrical outer surface 86 of the ferrule 36. When the ferrule 36 is inserted into the ferrule holder 40, an exterior surface 88 of the protrusion 80 may engage and cooperate with an interior surface 90 of the notch 84 of the ferrule to substantially align the ferrule 36 and ferrule housing 40 with one another.

To further facilitate aligning, adjusting, and/or tuning the position of the ferrule bore 38, the housing 20 may include a different keying arrangement than what is shown in FIG. 3. In some alternative embodiments, for example, the housing 20 may include a series of housing key 68 spaced apart around the inner surface of the housing, and/or the ferrule holder 40 may include a series of notches 72 spaced apart around the outer surface of the ferrule holder. Similar considerations apply with respect to the keying arrangement between the ferrule holder 40 and ferrule 36, if such a keying arrangement is desired. That is, the ferrule holder 40 may include a series of the ferrule keys 78 spaced apart around the passage 82 of the ferrule holder 40, and/or the ferrule 36 may include a series of notches 84 spaced apart around the outer surface of the ferrule. Some of the latter options will be discussed in greater detail below. Additionally, the positions of the keys 68, 78 and notches 72, 84 may be respectively reversed, and other suitable features may be provided for at least indirectly aligning, adjusting and/or tuning the position of the ferrule bore 38. The keys 68, 78 and notches 72, 84 may be generally referred to as "keying features" or simply "predetermined features" of the fiber optic connector 10.

A method of tuning an optical fiber interface such as, but not limited to, the fiber optic connector 10 may optionally include tuning the ferrule 36 or the position of the ferrule bore 38 prior to fixedly mounting the optical fiber 18 in the ferrule bore. For example, tuning the position of the ferrule bore 38 may include adjusting or preselecting a position of the ferrule bore, such as before an optical fiber 18 is inserted through the ferrule bore.

Referring to FIG. 3, the ferrule bore 38 may be positioned relative to a frame of reference comprising or based upon a reference point or datum. For example, in embodiments in which the ferrule 36 is generally or substantially cylindrical, the datum may be related to an outer diameter or circumference 92 (e.g., outer surface 86) of the ferrule 36, such as by a center point P representing a centroid of the outer surface of the ferrule and serving as the datum. Other suitable datums may be used, such as when a ferrule includes multiple bores 38, or the like.

In the embodiment shown in FIG. 3, the ferrule bore 38 is positioned eccentrically relative to the datum or center point P of the ferrule 36. FIG. 3 is schematic because, for example, although the ferrule 36 may be configured to have only the ferrule bore 38, an additional, differently positioned ferrule bore 38' is shown in FIG. 3 to provide an additional or contrasting example. FIG. 3 schematically shows that eccentricities E1, E2 of the ferrule bores 38, 38' may be measured from the datum or center point P of the ferrule 36, wherein the datum or center point P may be defined in relation to the ferrule's outer circumference 92. More specifically, the datum or center point P may be defined as the intersection between a vertical centerline Y and horizontal centerline X of a Cartesian coordinate system superimposed on the ferrule end face 39.

FIG. 3 further shows that the housing key 68 and ferrule key 78 may be substantially aligned with the vertical centerline Y of the ferrule 36. This alignment may facilitate a method of predetermining or predefining the eccentricity E1 of the ferrule bore 38 in relation to the center point P, the housing key 68, and/or the ferrule key 78. However, in other embodiments, the housing key 68 and/or the ferrule key 78 may be spaced apart from, or out of alignment with, the vertical centerline Y of the ferrule 36. Even more generally, the method of predetermining or predefining an eccentricity of the ferrule bore 38 of an optical interface may use any suitable frame of reference.

As schematically shown in FIG. 3, the eccentricities E1, E2 of the ferrule bores 38, 38' may be selected and/or the ferrule 36 may be positioned relative to the ferrule holder 40 and/or housing 20 such that the ferrule bores 38, 38' are positioned within one or more predetermined zones or tuning regions T1, T2. In FIG. 3, greatly enlarged examples of the tuning regions T1, T2 are schematically superimposed on the ferrule end face 39 for illustrative purposes. The outer bounds of the tuning region T1 is schematically represented by a first dashed line, wherein the first dashed line is formed of an alternating series of relatively long and relatively short dashes. The outer bounds of the tuning region T2 is schematically represented by a second dashed line, wherein the second dashed line is formed by dashes that are of equal length.

The tuning regions T1, T2 may be defined in relation to the datum or center point P, as shown in FIG. 3, but they may also be selected or aligned in relation to the housing key 68, the ferrule key 78, or any other suitable datum, frame of reference, and/or predetermined feature(s) of the fiber optic connector 10.

Figure 4:
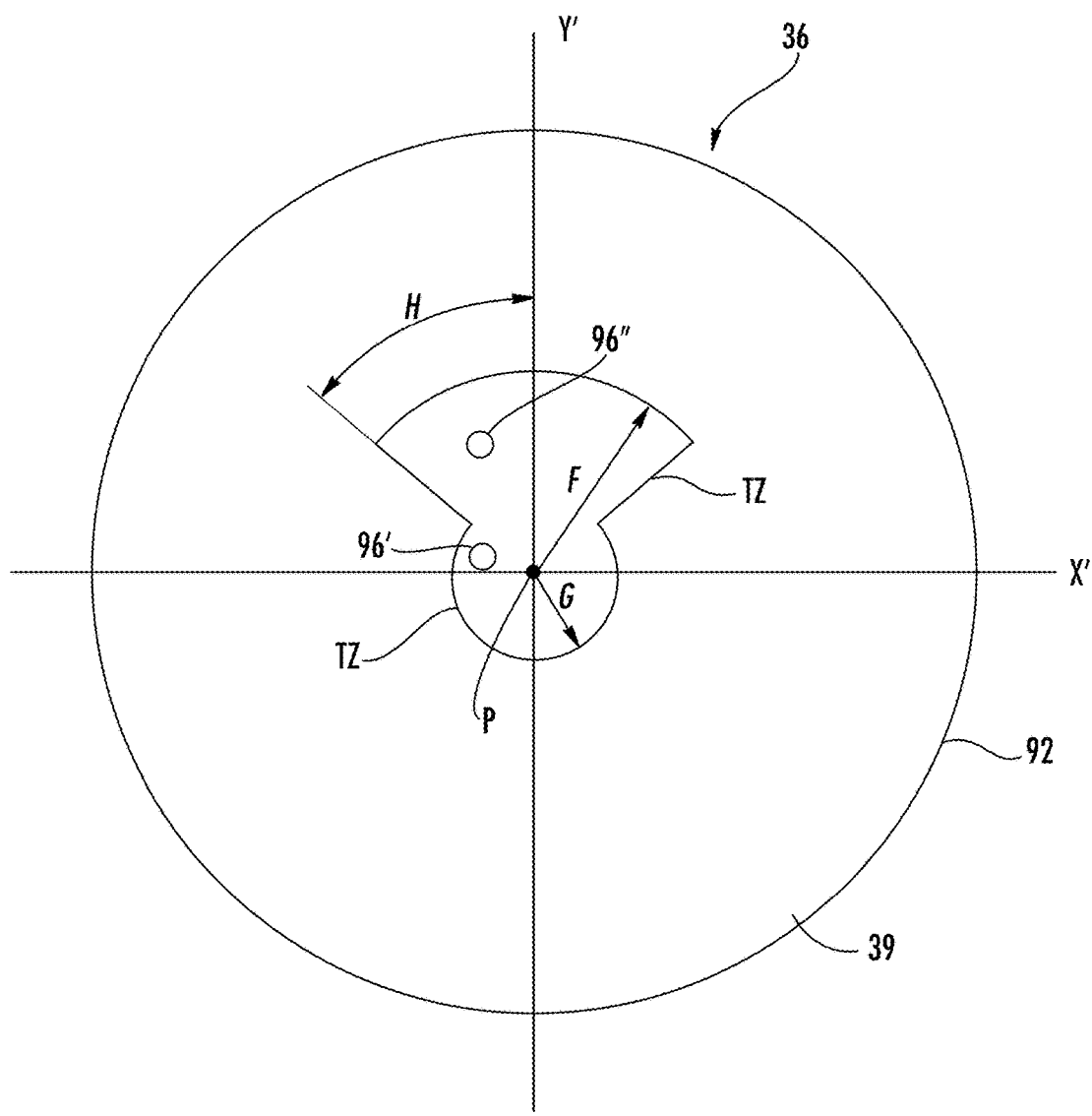
FIG. 4 is an enlarged, isolated, schematic front elevation view of the end face of the ferrule, wherein a coordinate system and a greatly enlarged example of a target zone are superimposed on the end face of the ferrule.

The locations and configurations of the tuning regions T1, T2 may be defined in a manner that seeks to increase the likelihood that the ferrule bores 38, 38', or more specifically the optical fibers 18 in the ferrule bores 38, 38' (and even more specifically, fiber cores 96 of the optical fibers), are substantially positioned in one or more target zones TZ (FIG. 4). The target zones may be based on manufacturer specifications or industry guidelines, as discussed in greater detail below. Following manufacturer and/or industry standards seeks to ensure fiber cores 96 of mated optical fibers 18 are sufficiently aligned so as to prevent significant insertion loss at the interface between the mated optical fibers. It should be noted that references to the position of the fiber cores 96 in this disclosure, including distances or offsets of the fiber cores relative to another element or datum, may be based on centers of the fiber cores.

FIG. 4 illustrates a greatly enlarged example of the target zone TZ schematically superimposed on the ferrule end face 39. The example target zone TZ shown in FIG. 4 is based upon industry guidelines, namely International Standard IEC 61755-3-1. The target zone TZ is generally defined using a polar coordinate system and provides an example of an allowable target area for the fiber core 96 at the ferrule end face 39 in relation to the datum or center point P of the ferrule 36. The polar coordinate system includes a two-dimensional coordinate system where points on a plane are defined by a distance from a reference or datum point and an angle in a reference direction. FIG. 4 shows that the specified datum for ICE 61755-3-1 is center point P, which is defined at the intersection of the vertical centerline Y and the horizontal centerline X of the ferrule end face 39. The allowable distance from the center point P is generally designated by coordinates G and F. The allowable angle is measured from the vertical centerline Y and is dependent on the allowable distance from the datum or center point P. For distances larger than G, the allowable angle is generally indicated as H. According to ICE 61755-3-1, G is 0.3 μm, F is 1.2 μm, and H is 50 degrees. Accordingly, fibers cores will meet the ICE 61755-3-1 specifications if the fiber cores are: a) within a distance of 0.3 μm from the center point P and positioned at any angle with respect to the vertical center line Y; or b) within a distance of 1.2 μm from the point P and positioned within about plus or minus 50 degrees of the upper portion of the vertical centerline Y. In FIG. 4, fiber core 96' is an example of the former, whereas fiber core 96" is an example of the latter.

With these industry standards in mind, the prescribed tuning regions T1 and/or T2 of FIG. 3 for placement of the ferrule bore 38 may be developed, defined, or selected to increase the likelihood that the final position of the fiber core, e.g. fiber cores 96' and 96" in FIG. 4, fall within a specified, prescribed, or predetermined region, e.g., within the target zone TZ, upon full assembly of the fiber optic connector 10.

As shown in FIG. 3, the ferrule bore(s) 38, 38' may be formed in the ferrule 36, and the ferrule may be positioned relative to the ferrule holder 40, such that the ferrule bores 38, 38' fall within various tuning regions T1, T2. The tuning regions T1, T2 may be selected based on the level of precision or accuracy desired for the final position of the optical fiber core 96 (FIG. 7) within the ferrule bore 38 at the ferrule end face 39. The tuning regions T1, T2 may be defined based on precision tuning or quadrant tuning approaches, respectively. In this paragraph, the boundaries of the tuning regions T1, T2 are described with reference to allowable positions of the ferrule bore 38, and in this regard each reference to the ferrule bore may more specifically be a reference to the lengthwise axis 38A (FIGS. 1 and 2) of the of the ferrule bore and/or the center of the of the ferrule bore. In precision tuning (T1), the distance of the ferrule bore 38 from the center point P may be up to about 1.5 µm, such as up to about 1.2 µm, and the ferrule bore may be positioned in substantially close proximity to the upper portion of the vertical centerline Y, so that the boundary of the precision tuning region T1 is substantially rectangular and substantially bisected by the vertical centerline Y. Alternatively, the boundary of the precision tuning region T1 may be configured so that the ferrule bore 38 may be positioned within an allowable angle from the upper portion of the vertical centerline Y, wherein the allowable angle may be up to about plus or minus 5 degrees. For quadrant tuning (T2), the distance of the ferrule bore 38 from the center point P may be up to about 1.5 µm, e.g., up to 1.2 µm, and the allowable angle from the vertical centerline Y may be about plus or minus 45 degrees. As compared to quadrant tuning, precision tuning employs a smaller allowable zone, i.e. a stricter tolerance, for positioning of the ferrule bore 38 and thus may result in decreased insertion loss in comparison to quadrant tuning. However, precision tuning may also result in a higher overall cost of construction/assembly.

The eccentricities E1, E2 of the ferrule bores 38, 38' may result from manufacturing tolerances associated with forming the ferrule 36, ferrule bores, or the like. However, the ferrule bores 38, 38' being respectively positioned in the tuning regions T1, T2 may result from tuning the ferrule bores after they are formed, such as by causing predetermined relative rotation between the ferrule 36 and the ferrule holder 40, and/or predetermined relative rotation between the ferrule assembly 42 and the housing 20, while the tuning regions T1, T2 remain stationary with reference to the housing 20. For example, tuning the position of ferrule bore 38 may include initially measuring the eccentricity E1 to determine at least a direction in which the longitudinal axis 38A (FIGS. 1 and 2) of the ferrule bore is spaced apart from the datum or center point P. For example, in FIG. 3 the lines E1, E2 may respectively designate the directions in which the lengthwise axes of the ferrule bores 38, 38' are spaced from the center point P after the ferrule 36 was rotated to tune the ferrule bores 38, 38'. Prior to the tuning, the lines E1, E2 may have extended in radial directions different than those in FIG. 3, so that the ferrule bores 38, 38' were outside of the tuning regions T1, T2.

As alluded to above, features of the fiber optic connector 10 may be configured for tuning the ferrule bore 38 by way of relative rotation between the ferrule assembly 42 and the housing 20, and/or by way of relative rotation between the ferrule 36 and the ferrule holder 40. Referring to FIG. 3, as one example, tuning the positions of the ferrule bores 38, 38' my include rotating the ferrule assembly 42 relative to the housing 20 to substantially align the directions of eccentricity E1, E2 with the housing key 68, so that the ferrule bores 38, 38' are respectively positioned in the tuning regions T1, T2, as shown in FIG. 3. As one example, such tuning may generally include manually pressing the ferrule 36 inwardly so that the spring 49 is compressed and the angled abutment surfaces (not shown) of the outer segment 44 of the ferrule holder 40 are separated from the angled mating surfaces (not shown) of the inner flange 52 of the housing 20. For example, while the ferrule holder 40 and the inner flange 52 are separated from one another, the ferrule assembly 42 may be manually rotated within and relative to the housing 20 to substantially align the crosswise directions of eccentricity E1, E2 with the housing key 68. Then the spring 49 may be allowed to cause reengagement between the ferrule holder 40 and the inner flange 52 to secure the ferrule assembly 42 in its newly tuned position.

Referring back to FIG. 3, as another example, tuning the positions of the ferrule bores 38, 38' may include rotating the ferrule 36 relative to the ferrule holder 40 to substantially align the crosswise directions of eccentricity E1, E2 with the ferrule key 78 and/or housing key 68, so that the ferrule bores 38, 38' are respectively positioned in the tuning regions T1, T2, as shown in FIG. 3. As one example for facilitating such tuning, the ferrule 36 may include a series of notches 84 positioned around the outer surface of the ferrule, and the ferrule may be rotationally fixed in a predetermined position relative to the ferrule holder 40 by selecting a respective one of the notches 84 for receiving the ferrule key 78. For facilitating quadrant tuning (T2), adjacent notches 84 may be spaced apart from one another by 90 degrees around the outer surface of the ferrule 36. For facilitating precision tuning (T1), the adjacent notches 84 would be closer to one another. Alternatively, suitable aligning and tuning features other than keys 68 and notches 84 may be used. This includes marks, indicia, or the like on one or more surfaces of the ferrule 36, ferrule holder 40, and/or housing 20.

Tuning the position of the ferrule bores 38, 38', such as by using the "precision" or "quadrant" tuning approaches discussed above, may help to increase the likelihood that the fiber cores 96 (FIG. 7) positioned in the ferrule bores 38, 38' are located within industry specifications, and may help to decrease associated insertion losses. However, in some instances, solely tuning the ferrule bores 38, 38' may be insufficient to ensure that the ultimate location of the fiber core 96 meets specific standards or prescribed specifications, as other factors can influence the final position of the fiber core 96. These factors may include the ferrule bore 38 having a larger diameter than the optical fiber 18, axial misalignments between the ferrule bore and optical fiber, and/or the fiber core 96 being asymmetrically positioned in the optical fiber. Accordingly, methods of actively tuning the fiber core 96 after the optical fiber 18 has been inserted into the ferrule bore 38 may be utilized in a manner that seeks to ensure proper positioning of the fiber core so as to minimize insertion loss. These methods of tuning the fiber core 96 may be performed in addition to, or independently of, tuning the ferrule bore 38.

Figure 5:
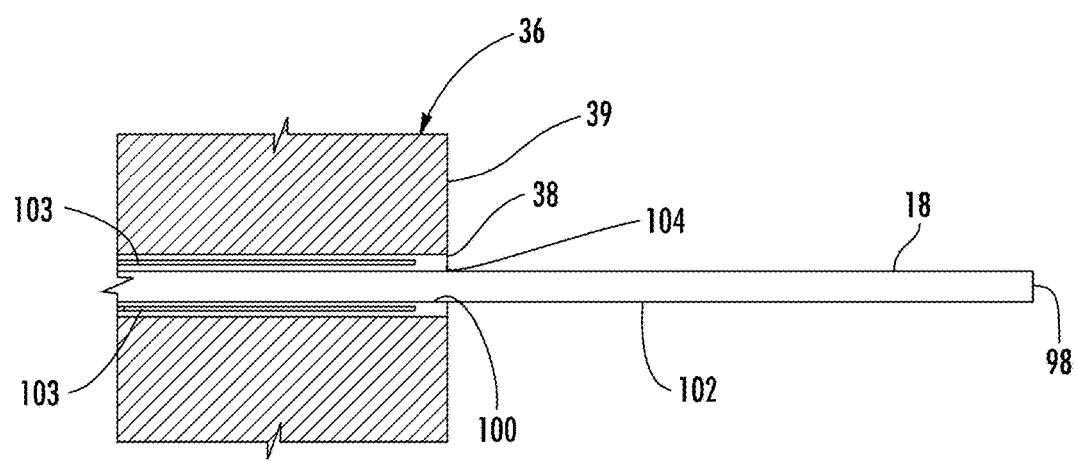
FIG. 5 is an enlarged, schematic, partially cross-sectional side view of a representative portion of the ferrule having a representative optical fiber of the cable of FIG. 1 extending therethrough.

Referring to FIG. 5, an example of a method of mounting the optical fiber 18 in the ferrule 36 and tuning the fiber core 96 may begin with inserting a portion of the optical fiber through the ferrule bore 38. The optical fiber 18 may be inserted through the ferrule bore 38 so that the ferule 36 is positioned between the cable 12 (FIG. 1) and a terminal end 98 of the optical fiber. More specifically, the terminal end 98 of the optical fiber 18 may be inserted through the ferrule bore 38 so that a first length 100 of the optical fiber is within the ferrule bore and a second length 102 of the optical fiber extends outwardly from an outer end opening 104 of the ferrule bore. An adhesive material 103 (also referred to as a "bonding agent"), such as an epoxy, "hot melt" thermoplastic, or other suitable adhesive, may be within the ferrule bore 38. The adhesive material 103 is cured or otherwise hardened to at least aid in securing the optical fiber 18 in the ferrule bore 38. The adhesive material 103 may not be hardened, and in some embodiments may not even be activated, until after mounting the optical fiber 18 in the ferrule 36, as will be discussed in greater detail below.

Figure 6:
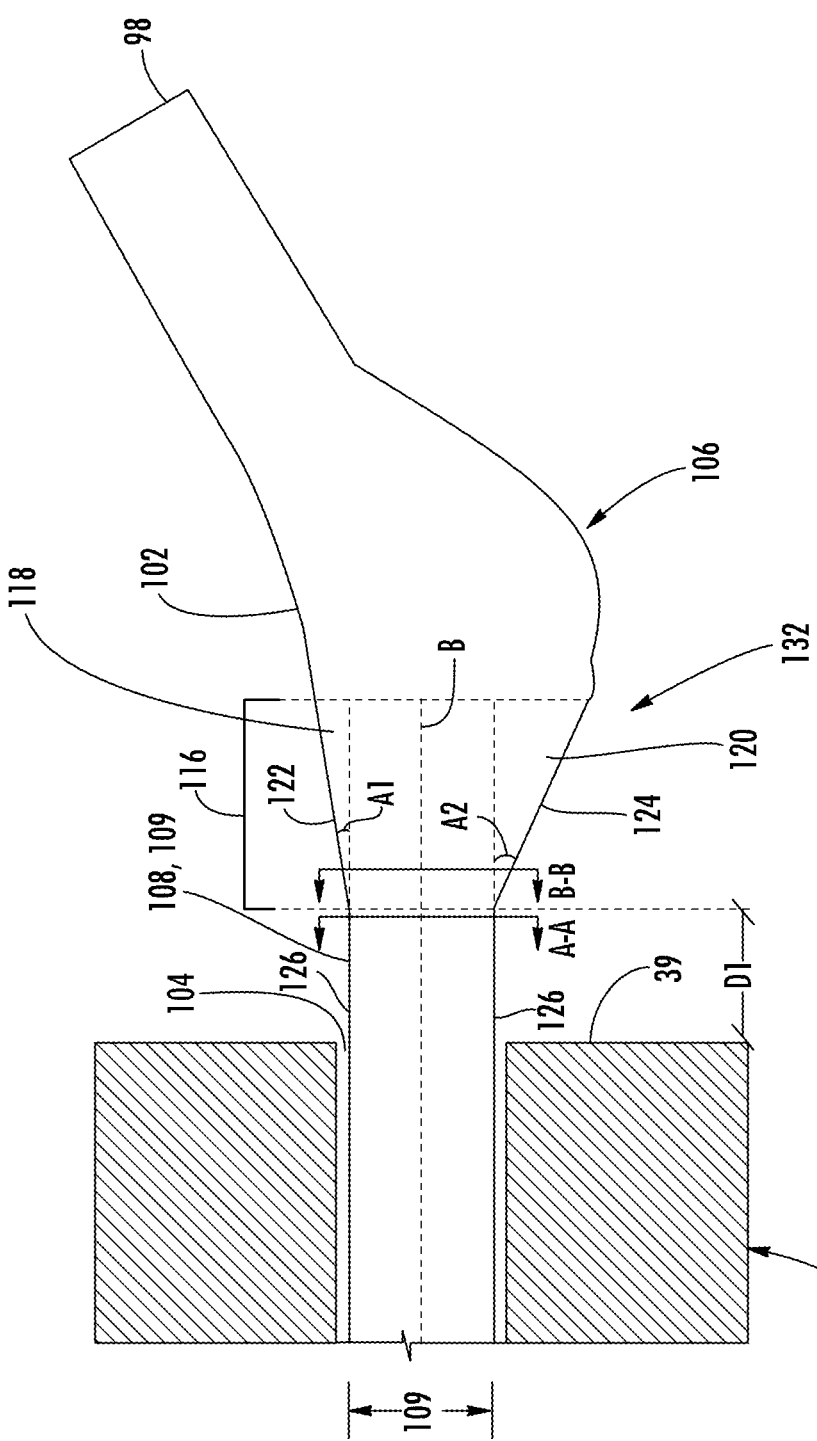
FIG. 6 is similar to FIG. 5 except, for example, that the representative optical fiber has an eccentric bulge formed therein

While the second length 102 of the optical fiber 18 extends outwardly from the outer end opening 104 of the ferrule bore 38, as shown in FIG. 5, a deformed or enlarged portion, such as an eccentric bulge 106 (FIG. 6), may be formed in the second length 102 of the optical fiber. Referring to FIG. 6, the eccentric bulge 106 may be formed at a predetermined lengthwise distance D1 from the ferrule end face 39 so that the eccentric bulge 106 is spaced apart from the ferrule end face. A portion 108 of the optical fiber 18 may extend between the ferrule end face 39 and the eccentric bulge 106, and that portion 108 may maintain or keep a substantially unchanged cross-sectional shape or outer circumference 109 after formation of the eccentric bulge. In the remainder of the Detailed Description section of this disclosure, the portion 108 of the optical fiber 18 with the substantially unchanged cross-sectional shape or outer circumference 109 is generally referred to as "the substantially unchanged portion 108." As will be discussed in greater detail below, the eccentric bulge 106 may be formed by asymmetric localized heating of a portion of the optical fiber 18 that is adjacent to the substantially unchanged portion 108. For example, when the respective portion of the optical fiber 18 is heated in a predetermined manner, capillary and gravitational effects may cause the heated portion of the optical fiber to bulge, distort, and/or bend in an asymmetric fashion to form the eccentric bulge 106. The localized heating for formation of the eccentric bulge 106 may be carried out through the use of any suitable heat source, such as, by way of example, a flame, laser beam, or electrical arc.

Figure 7:
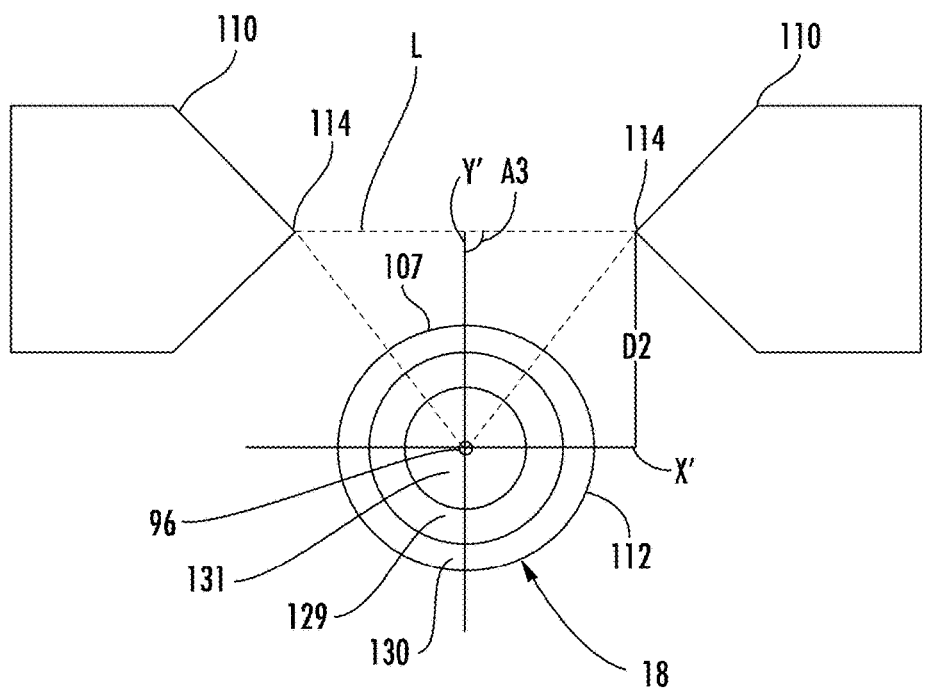
FIG. 7 is an enlarged, schematic, end elevation view of a representative optical fiber with a pair of electrodes positioned above the optical fiber, in accordance with an embodiment.

As schematically shown in FIG. 7, the localized heating for forming the eccentric bulge 106 (FIG. 6) may be provided by one or more high temperature fusion arc(s) generated between a pair of opposing electrodes 110. The heat source used for localized heating of the optical fiber 18 can be intentionally misaligned with respect to the optical fiber, so that the heating is asymmetrical. FIG. 7 shows that the electrodes 110 may be positioned so that they are off-axis in relation to a horizontal centerline X' of the outer circumference 112 of the optical fiber 18. For example, a reference line L extending between the tips 114 of the electrodes can be spaced apart, or laterally offset, from the horizontal centerline X' of the outer circumference 112 of the optical fiber 18 by a distance D2. The tips 114 of the electrodes 110 may also be positioned/oriented with a predetermined angle A3 between the reference line L and a vertical centerline Y' of the outer circumference 112 of the optical fiber 18. The predetermined angle A3 can be selected such that the vertical centerline Y' and the reference line L are substantially perpendicular, although any other suitable angle A3 may be utilized. As discussed in greater detail below, varying or altering the position and/or orientation of the electrode tips 114 in relation to the optical fiber 18 and/or ferrule end face 39 (e.g., varying or altering the distances D2, D1 (FIG. 6) and/or angle A3) may affect the configuration of the eccentric bulge 106.

As schematically shown in FIG. 6, the eccentric bulge 106 includes an asymmetric cross-sectional region 116 that is adjacent to the substantially unchanged portion 108. The asymmetric cross-sectional region 116 may be generally in the form of a frustum of an eccentric cone. The asymmetric cross-sectional region 116 may further be substantially disproportionate, uneven, irregular, or unbalanced about a lengthwise axis B of the optical fiber 18. FIG. 6 shows that the asymmetric cross-sectional region 116 may include a hemispherical top portion 118 and a hemispherical bottom portion 120. The top portion 118 may have an inclined top outer surface 122, and the bottom portion 120 may have an inclined bottom outer surface 124. As an alternative to what is shown in FIG. 6, the top outer surface 122 may not be inclined. As shown in FIG. 6, the top and bottom outer surfaces 122, 124 may have slopes in relation to an outer surface 126 of the substantially unchanged portion 108. Stated differently, the inclined top outer surface 122 may extend at an angle A1 in relation to the outer surface 126 of the substantially unchanged portion 108, while the inclined bottom outer surface 124 may extend at an angle A2 in relation to the outer surface 126 of the substantially unchanged portion. The angles A1, A2 may be different from each other so that the slopes of the inclined outer surfaces 122, 124 are also different. For example, in FIG. 6, the inclined bottom outer surface 124 ("major inclined surface") has a greater slope or inclination as compared to the inclined top outer surface 122 ("minor inclined surface"), as will be discussed in greater detail below. Although FIG. 6 shows the minor and major inclined surfaces 122, 124 extending substantially linearly (i.e., straight), the shapes of the asymmetric outer surface 132 and eccentric bulge 106 may vary in any suitable manner (e.g., the minor and major inclined surfaces 122, 124 may be non-linear and/or the angles A1, A2 and associated slopes may vary along the minor and major inclined surfaces). More generally, as compared to the minor inclined surface 122, the major inclined surface 124 extends farther outwardly from the fiber core 96.

Referring back to FIG. 7, the optical fiber 18 may include, and initially the portion of the optical fiber in which the eccentric bulge 106 is formed may include not only the fiber core 96, but also a substantially cylindrical cladding 131 surrounding the fiber core, and optionally one or more substantially cylindrical polymer coatings surrounding the cladding. An inner primary coating 129 and outer secondary coating 130 are provided in the embodiment shown. The inner primary coating 129 may be configured to act as a shock absorber to minimize attenuation caused by any micro-bending of the optical fiber 18. The outer secondary coating 130 may be configured to protect the primary coating 129 against mechanical damage, and to act as a barrier to lateral forces. The optical fiber 18 can further include a colored, thin ink layer (not shown) for identification, and this additional layer may be coated onto the outer surface of the secondary coating 130. The outer diameter of the optical fiber 18 may be about 250 µm when including the primary and secondary coatings 129, 130, and about 125 µm when the primary and secondary coatings 129, 130 are removed.

Figure 8:
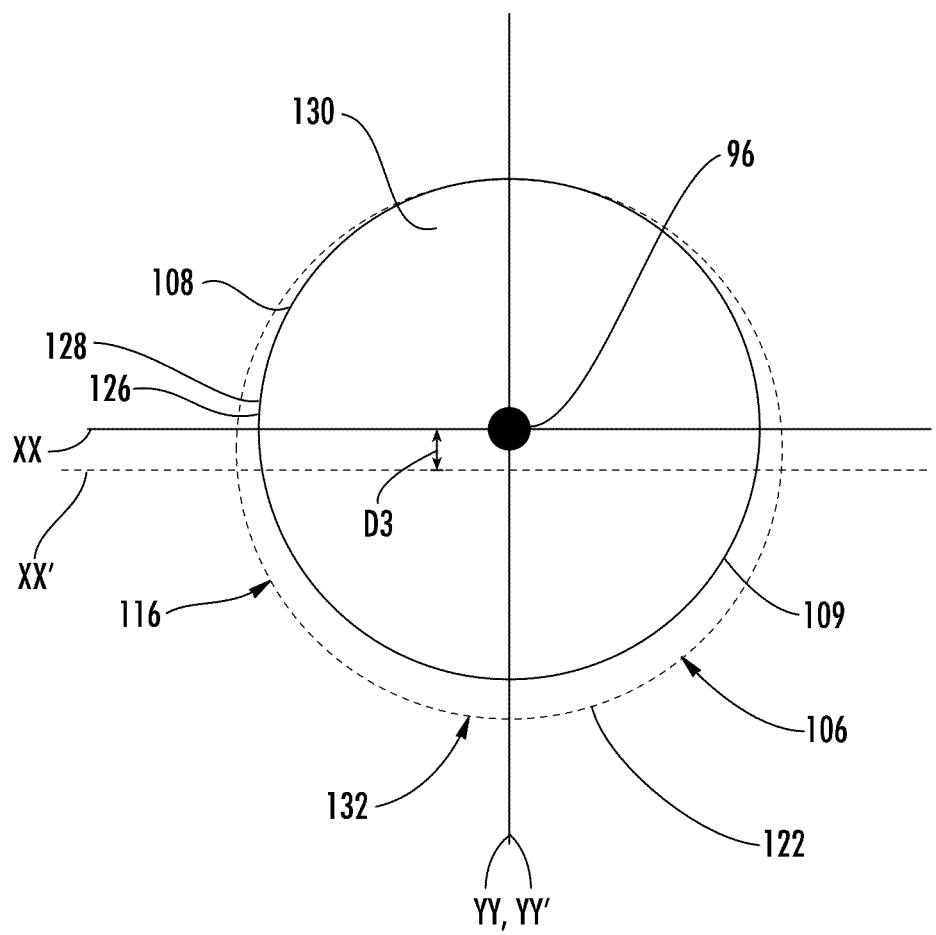
FIG. 8 schematically shows a cross-section of a representative optical fiber prior to and after formation of the eccentric bulge, in accordance with an embodiment.
Figure 9:
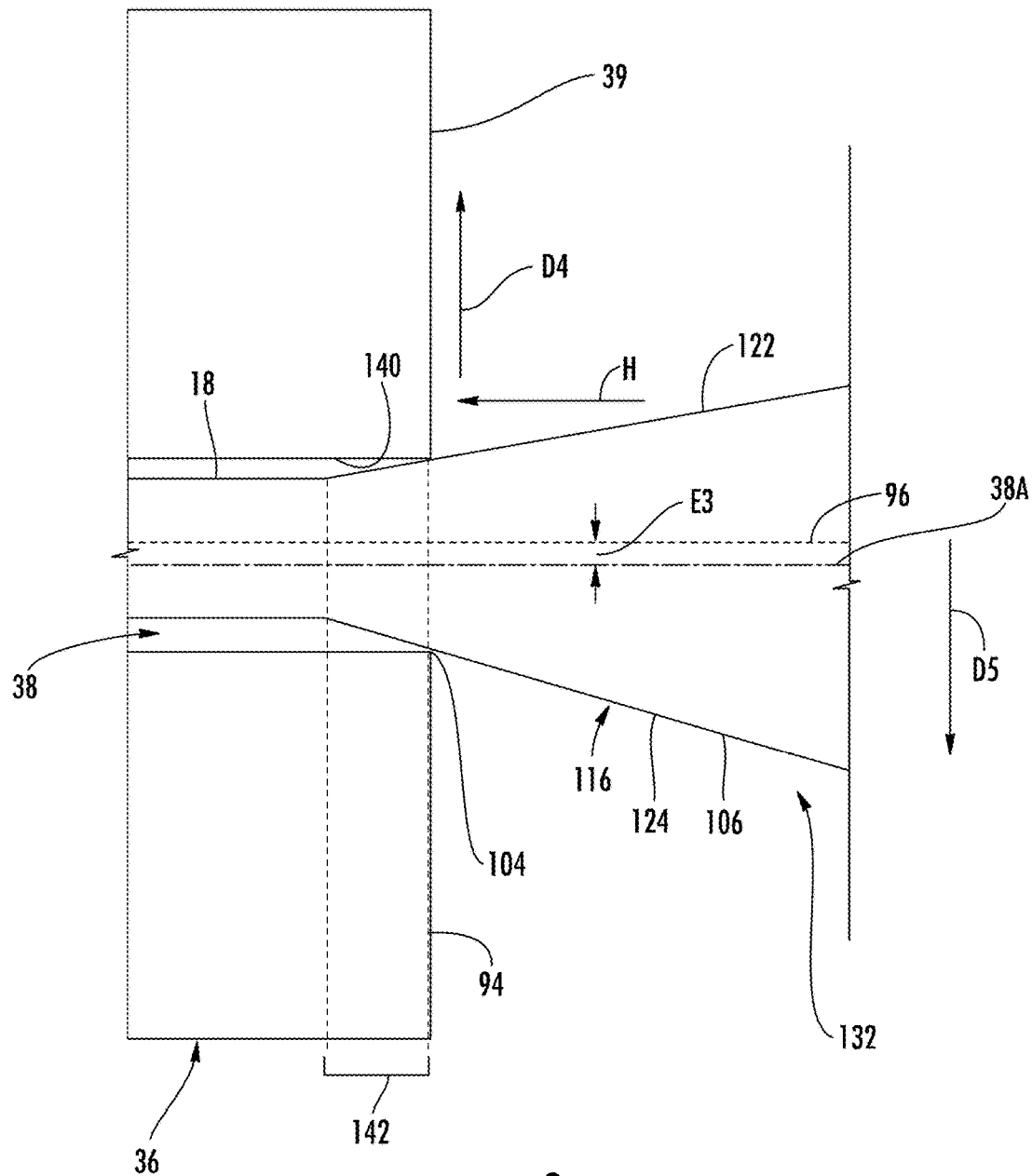
FIG. 9 is similar to FIG. 6 except, for example, that a portion of the eccentric bulge is at least partially wedged into a bore of the ferrule, in accordance with an embodiment.

In accordance with an embodiment, the fiber core 96 and cladding 131 each comprise glass and have higher heat distortion temperatures than the coatings 129, 130. Accordingly, in the asymmetric cross-sectional region 116 (FIG. 6), at least the fiber core 96 may remain substantially undeformed during creation of the eccentric bulge 106, which is in contrast to, for example, at least the outer secondary coating 130 being substantially deformed to at least partially define the asymmetric outer surface 132 (FIG. 6) of the asymmetric cross-sectional region 116. After the eccentric bulge 106 is at least partially formed, the associated heating is discontinued to allow the coatings 129, 130 to re-harden. In another embodiment, at least the portion of the optical fiber 18 including the eccentric bulge 106 does not include the coatings 129, 130, and at least an outer portion of the cladding 131 is substantially deformed to at least partially define the asymmetric outer surface 132 of the asymmetric cross-sectional region 116. That is, the outermost surface of the cladding 131 may be the asymmetric outer surface 132 of the asymmetric cross-sectional region 116. Referring to FIGS. 6, 8, and 9, the asymmetric outer surface 132: a) is a portion of the outer surface of the optical fiber 18; b) extends around the portion of the fiber core 96 (FIG. 8) that is within the asymmetric cross-sectional region; and c) includes the minor and major inclined surfaces 122, 124 (FIG. 6).

FIG. 8 schematically shows a cross-section of the substantially unchanged portion 108 superimposed with a cross-section of the asymmetric cross-sectional region 116, wherein these cross-sections are respectively taken along lines A-A and lines B-B of FIG. 6, and wherein the cross-section of the asymmetric cross-sectional region 116 is schematically represented by a dashed line. As can be seen from FIG. 8, in one example, the asymmetric outer surface 132 may remain substantially circular in cross-section, but be enlarged in relation to the substantially unchanged portion 108. FIG. 8 further shows that the fiber core 96 may be substantially centered in relation to the outer circumference 126 of the substantially unchanged portion 108. That is, the fiber core 96 is substantially aligned with an intersection between the vertical centerline YY and the horizontal centerline XX of the outer circumference 128 of the substantially unchanged portion 108. However, as shown in FIG. 8, the fiber core 96 may be off-axis or eccentric in relation to the asymmetric outer surface 132, and vise-versa. For example, the fiber core 96 may be positioned at a perpendicular or crosswise distance D3 in relation to the horizontal centerline XX' of the asymmetric outer surface 132. Formation of the eccentric bulge 106 has caused the asymmetric outer surface 132 to move relative to the portion of the fiber core 96 within the asymmetric cross-sectional region 116. FIG. 8 also shows that the fiber core 96 may remain centered about the vertical central axis YY' of the asymmetric outer surface 132, which may remain aligned with the vertical centerline YY of outer circumference 128 of the substantially unchanged portion 108. Although FIG. 8 is generally illustrative of a downward movement of at least some of the asymmetric outer surface 132 relative to the fiber core 96, the relative movement between the asymmetric outer surface and the fiber core may extend in any suitable directions.

Referring to FIG. 9, the asymmetric cross-sectional region 116 may be shorter in length than shown in the drawings. In one example, the asymmetric cross-sectional region 116 may have a length equal to, or slightly greater than, the distance identified by numeral 142 in FIG. 9. As another example, which is shown in FIG. 9, the asymmetric cross-sectional region 116 may be theoretically divided into portions, so that the asymmetric cross-sectional region 116 may be referred to as a major asymmetric cross-sectional region 116 ("major asymmetric region") that includes an initial or minor asymmetric cross-sectional region 142 ("minor asymmetric region").

In the example of FIG. 9, after the eccentric bulge 106 is formed, the optical fiber 18 can be moved in relation to the ferrule 36 so that the minor asymmetric region 142 is positioned within the ferrule bore 38. For example, the optical fiber 18 may be pulled so that the major asymmetric region 116 moves back towards the ferrule end face 39 in a longitudinal direction H. The longitudinal direction H may be substantially parallel to, or substantially coaxial with, the bore axis 38A. More specifically, the eccentric bulge 106 can be moved toward the ferrule end face 39 so that the major asymmetric region 116 contacts an inner surface 140 of the ferrule bore 38. Stated differently, after the major asymmetric region 116 is formed at a distance from the ferrule 36, there may be relative movement between the fiber 18 and the ferrule, so that the major asymmetric region, or more specifically the minor asymmetric region 142, is wedged into the ferrule bore 38. This relative movement between the fiber 18 and the ferrule 36 may be provided, for example, through manual action or any other suitable action. For example, the manual or other suitable action may include pulling the fiber optic cable 12 (FIG. 1) or optical fiber 18.

The inner surface 140 of the ferrule bore 38 may be within, or substantially adjacent to, the outer end opening 104 of the ferrule bore 38. Movement of the optical fiber 18 may further cause sliding contact between the major asymmetric region 116 (e.g., one or more of the inclined outer surfaces 122, 124) and the inner surface 140 of the ferrule bore 38. The movement of the optical fiber 18 may be continued until the major asymmetric region 116 is substantially wedged within the ferrule bore 38. As an example, the diameter of the ferrule bore 38 may be only between about 500 nm and about 1500 nm larger than the outer diameter of the substantially unchanged portion 108, such that wedged sliding contact between the major asymmetric region 116 and the inner surface 140 of the ferrule bore may occur at the minor asymmetric region 142.

Referring to FIG. 9, in response to the sliding engagement or contact between the minor asymmetric region 142 (e.g., at the lower inclined outer surface 124) and the inner surface 140 of the ferrule bore 38, the major asymmetric region 116 may move at least relative to the ferrule 36. The magnitude and direction of this movement of the major asymmetric region 116 are at least partially responsive to, or a function of, the asymmetrical configuration of the minor asymmetric region 142. For example, the minor asymmetric region 142 may be configured so that the entire major asymmetric region 116 and at least one adjacent portion of the optical fiber 18 are moved in a direction D4 that is substantially crosswise or perpendicular to the bore axis 38A.

The portion of the fiber core 96 within the major asymmetric region 116 will typically move with the major asymmetric region in the crosswise direction D4 in response to the sliding contact between the major asymmetric region and the inner surface 140 of the ferrule bore 38. This movement or shift in the fiber core 96 may result in an eccentricity or offset between the fiber core 96 and the bore axis 38A. For example, FIG. 9 shows an eccentricity E3 between the fiber core 96 and the bore axis 38A, wherein the eccentricity E3 extends in the crosswise direction D4, which extends crosswise or perpendicular to the bore axis 38A. More generally, FIG. 9 shows that the fiber core 96 is eccentrically positioned in the ferrule bore 38.

As at least alluded to above, in one aspect of this disclosure, features of the eccentric bulge 106 and ferrule 36, or more specifically the major asymmetric region 116 and the ferrule bore 38, may be cooperatively configured for facilitating tuning the position of the portion of the fiber core 96 that is located in the ferrule bore opening 104, or the like. This tuning of the position of the fiber core 96 relative to the bore axis 38A, or some other suitable frame of reference, may be at least partially facilitated by adjusting the offset or eccentricity E3 of the portion of the fiber core 96 within the minor asymmetric region 142. In FIG. 9, the eccentricity E3, or more specifically the crosswise direction D4, is the direction in which the lengthwise axis of the portion of the fiber core 96 within the minor asymmetric region 142 is spaced apart from the bore axis 38A.

In FIG. 9, the major inclined surface 124 is spaced in a perpendicular or crosswise direction D5 from the portion of the fiber core 96 within the minor asymmetric region 142. As mentioned above, the major inclined surface 124 has the greatest slope or incline as compared to any other inclined surfaces (e.g., the inclined surface 122) of the asymmetric outer surface 132, or more specifically as compared to the other inclined surfaces of the asymmetric outer surface of the minor asymmetric region 142. In FIG. 9, the crosswise direction D5 is aligned with, but opposite from, the crosswise direction D4. The asymmetric outer surface 132 may be configured so that the crosswise directions D4 and D5 always extend substantially oppositely from one another. Accordingly, the crosswise direction D4, in which the lengthwise axis of the portion of fiber core 96 within the minor asymmetric region 142 is spaced apart from the bore axis 38A, can be adjusted by changing the crosswise direction D5. The crosswise direction D5 can be changed by changing the relative rotational position between the major inclined surface 124 and the ferrule bore 38.

The relative rotational position between the major inclined surface 124 and the ferrule bore 38, and thus the crosswise direction D5, can be controlled in any suitable manner to thereby control the crosswise direction D4 in which the lengthwise axis of the portion of the fiber core 96 within the minor asymmetric region 142 moves away from the bore axis 38A in response to the eccentric bulge 106 being wedged into the ferrule bore. For example, after the eccentric bulge 106 is formed and before the eccentric bulge is wedged into the ferrule bore 38, relative rotation may be caused between the eccentric bulge and the ferrule 36 so that the major inclined surface 124 is located in a predetermined rotational position relative to the bore axis 38A. For example, the crosswise direction D5, in which the major inclined surface 124 is spaced from the bore axis 38A, may be generally or substantially aligned with the housing key 68 (FIG. 3), the ferrule key 78 (FIG. 3), or any other suitable datum or frame of reference of the fiber optic connector 10, or the like. In addition or alternatively, processing parameters used for formation of the eccentric bulge 106 can be varied to achieve a predetermined shape or configuration of the eccentric budge, to control the general or substantial alignment of the crosswise direction D5 with the housing key 68, the ferrule key 78, or any other suitable datum or frame of reference of the fiber optic connector 10, or the like. More specifically, the positioning of the major inclined surface 124 can be controlled in a manner that seeks to decrease insertion loss and/or seeks to ensure that the fiber core 96 within the minor asymmetric region 142 is positioned within one or more predetermined regions or zones, such as the target zone TZ shown in FIG. 4.

With continued reference to FIG. 9, in one example, the determination of where to position the major inclined surface 124 may be based at least partially upon a knowledge of, or an estimate of, the crosswise direction E1 (FIG. 3) in which the bore axis 38A is spaced apart from the datum or center point P. For example, if it is determined that the bore axis 38A is positioned close to, or at least partially outside, one or more of the predetermined tuning regions T1, T2 (FIG. 3), there may be a significant likelihood that the fiber core 96 within the minor asymmetric region 142 wedged into the ferrule bore 38 may likewise fall outside of the predetermined tuning regions after the optical fiber 18 is mounted in the ferrule 36. Accordingly, the specific processing parameters for formation of the eccentric bulge 106 may be selected to form a predetermined configuration of the eccentric bulge that may be at least partially responsible for causing the fiber core 96 within the minor asymmetric region 142 to move into the predetermined tuning regions T1, T2 (FIG. 3) or target zone TZ (FIG. 4) in response to the minor asymmetric region being wedged into the ferrule bore 38. For example, the eccentric bulge 106 may be configured so that the crosswise direction D5 may be substantially aligned with the crosswise direction E1 (FIG. 3) in which the lengthwise axis of the ferrule bore 38 is spaced apart from the datum or center point P, such as by these directions extending in substantially the same direction, or these directions extending in substantially opposite directions.

After the minor asymmetric region 142 is wedged within the ferrule bore 38, any adhesive material 103 (FIG. 5) may be hardened, set, and/or cured in any suitable manner, to further fixedly mount at least the minor asymmetric region to the ferrule 36. For example, the adhesive material 103 may be maintained in a liquid state until after the minor asymmetric region 142 is wedged within the ferrule bore 38. In addition, the portion of the eccentric bulge 106 and any other portion of the optical fiber 18 extending outwardly past the ferrule end face 39 may be substantially removed, such as by cleaving and then polishing. As a more specific example, the outer portion of the eccentric bulge 106 may be removed using a close-cleaving process, such as, for example, laser cleaving, wire scribing, or any other suitable cleaving process. As another example, the cleaving may comprise compressive wedge cleaving, as described in U.S. Pat. No. 9,144,917, which is incorporated herein by reference in its entirety. As a result of the minor asymmetric region 142 being wedged into the ferrule bore 38, the minor asymmetric region may be in a state of multi-axial compressive stress, and the multi-axial compressive stress may extend across the minor asymmetric region. The portion of the eccentric bulge 106 extending outwardly from the minor asymmetric region 142 may be broken apart from the minor asymmetric region while the minor asymmetric region is in the state of multi-axial compressive stress. The breaking can include propagating a crack across the major asymmetric region 116. The crack can be positioned in sufficiently close proximity to the minor asymmetric region 142 so that the multi-axial compressive stress restricts the crack from penetrating the minor asymmetric region. After the cleaving, a series of polishing steps may be implemented so that the outer end of the minor asymmetric region 142 is substantially flush with the ferrule end face 39.

Figure 10:
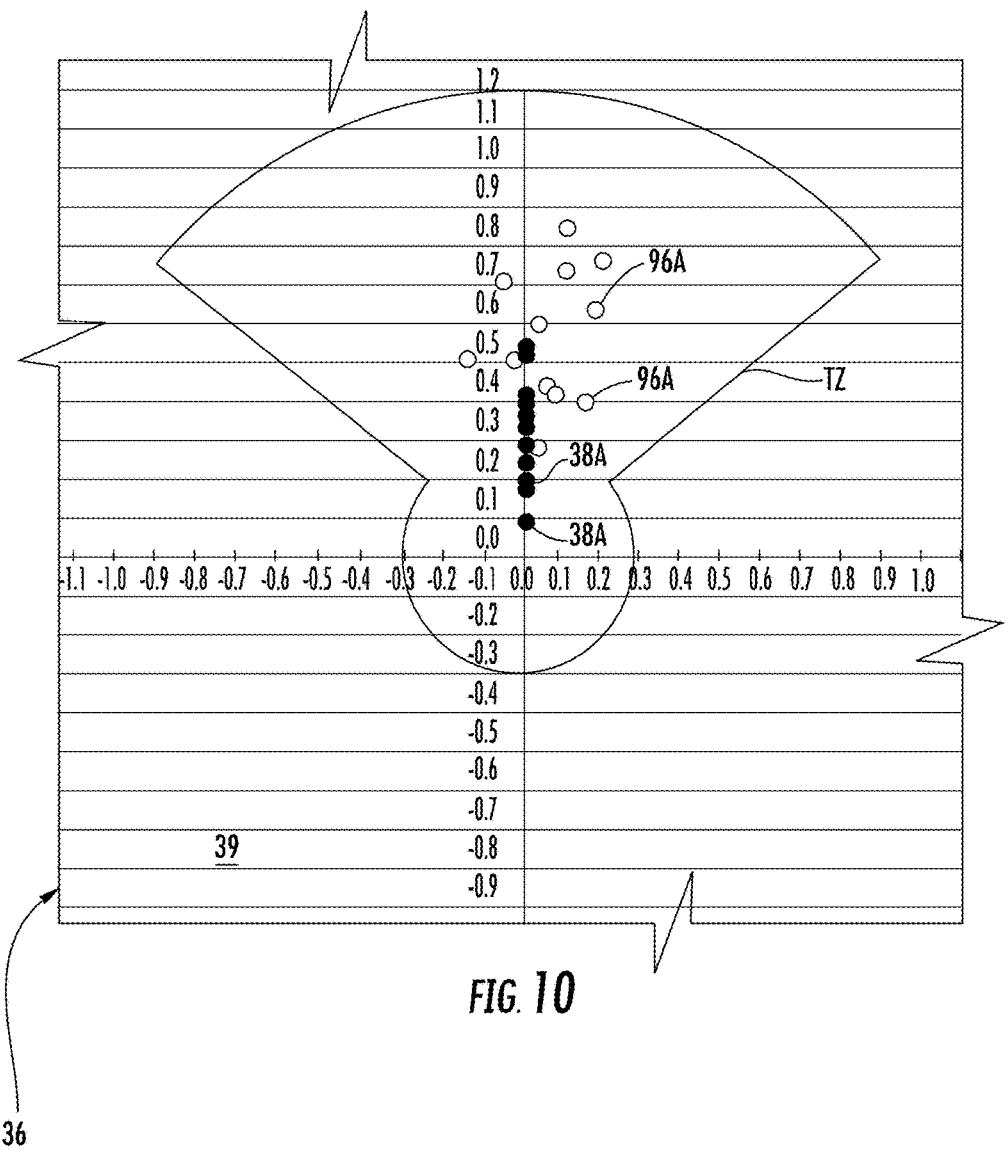
FIG. 10 schematically illustrates examples of locations of ferrule bores and optical fiber cores tuned in accordance with an embodiment.

FIG. 10 illustrates a graph showing positions of selected features of numerous ferrules 36 in which minor asymmetric regions 142 have been respectively mounted at least by way of asymmetric wedging, as discussed above. FIG. 10 is schematically illustrative of fiber cores 96 being eccentrically positioned in respective ferrule bores 38. More specifically, in FIG. 10, locations of bore axes 38A are represented by solid black dots, and lengthwise axes of the fiber cores 96 ("core axes 96A") within the minor asymmetric regions 142 respectively wedged in the ferrule bores 38 are represented by black dots with white centers. For each of the embodiments represented in FIG. 10, the bore axis 38A and the core axis 96A are positioned in the target zone TZ. Also for each of the embodiments represented in FIG. 10, the crosswise direction of the eccentricity E1 (FIG. 3) in which the bore axis 38A is spaced apart from the datum or center point P of the ferrule 36, the crosswise direction D4 (FIG. 9) in which the core axis 96A is spaced apart from the bore axis, and the crosswise direction D5 (FIG. 9) in which the major inclined surface 124 (FIG. 9) is spaced outwardly from the core axis are substantially aligned with one another and are also substantially aligned with the vertical axis of the graph of FIG. 9. For example, in the embodiments of FIG. 9, the crosswise direction of the eccentricity E1, the crosswise direction D4, and the crosswise direction D5 may be substantially aligned in relation to the housing key 68 (FIG. 3), the ferrule key 78 (FIG. 3), or any other suitable datum or frame of reference of the fiber optic connector 10, or the like.

As at least alluded to above, the eccentric bulge 106 may be configured to at least partially define the crosswise direction D5 in which the major inclined surface 124 is spaced outwardly from the core axis 96A. For example, the asymmetry or geometry of the eccentric bulge 106 can be a function of the particular process parameters chosen for the localized heating of the optical fiber 18. Referring back to FIG. 7, for example, the distance D2 between and the horizontal center line X' of the outer circumference 112 of the optical fiber 18 and the reference line L extending between the tips 114 of the electrodes 110 can be increased or decreased to vary the configuration of the eccentric bulge 106, such as by changing the angles A1, A2 (FIG. 6) of the major asymmetric region 116. The orientation of the electrodes 110 in relation to the optical fiber 18 can also be varied to change the resulting configuration of the eccentric bulge 106. Varying the orientation of the electrodes 110 may generally include fluctuating or changing the angle A3 between the reference line L and the vertical centerline Y' of the outer circumference 112 of the optical fiber 18. In addition, the crosswise direction D5 (FIG. 9) in which the major inclined surface 124 is spaced outwardly from the core axes 96A can be changed by varying the rotational position between the pair of electrodes 110 and the ferrule 36 through which the optical fiber 18 extends, or the like.

Additionally, changing the length of the optical fiber 18 that protrudes past the electrodes 110, or the length of the optical fiber 18 that extends outwardly from the ferrule end face 39 (e.g., changing the second length 102 shown in FIG. 5), may also alter the shape or configuration of the eccentric bulge 106. In particular, varying the length of the optical fiber 18 extending past the electrodes 110, or varying the second length 102 (FIG. 5), may increase or decreases the mass of a corresponding unsupported length of the optical fiber 18 extending past the electrical arc generated by the electrodes 110, and thereby increase or decrease the effect of gravity on the associated deformation of the optical fiber 18. For example, as the amount of the optical fiber 18 extending unsupported past the electrical arc generated by the electrodes 110 increases, the effects of gravity on the deformation process increase as compared to capillary forces, which can thereby alter the ultimate configuration of the eccentric bulge 106.

The orientation of the ferrule 36, which is supporting the optical fiber 18 in which the eccentric bulge 106 is being formed, may also alter the configuration of the eccentric bulge. For example, if the lengthwise axis of the ferrule 36 extends horizontally so that the optical fiber 18 extends horizontally, and the amount of the optical fiber 18 extending past the electrical arc generated by the electrodes 110 is relatively long, then gravitational force may at least partially cause the eccentric bulge 106 to bend significantly downward. As a contrasting example, the ferrule 36 may be oriented or positioned so that the lengthwise axis of the ferrule extends downward. The direction of gravitational force can thereby be substantially aligned with the lengthwise axis B (FIG. 6) of the optical fiber 18, and thus the effect of gravity may be negated or minimized, to change the resulting configuration of the eccentric bulge 106. Accordingly, the orientation of the lengthwise axis B of the optical fiber 18 may be one of several factors that may be modified to modify the configuration of the eccentric bulge 106.

Figure 11A:
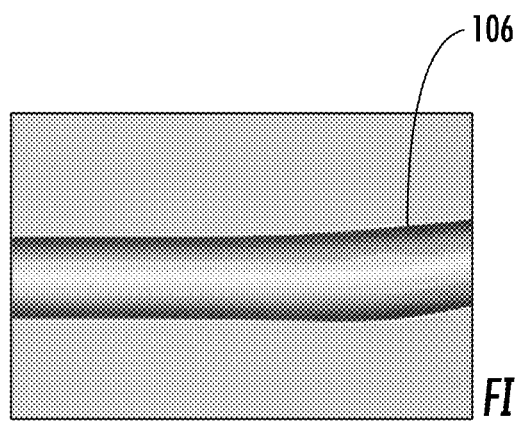
FIGS. 11A-11C show various possible shapes of eccentric bulges in optical fibers, according to embodiments of this disclosure.
Figure 11B:
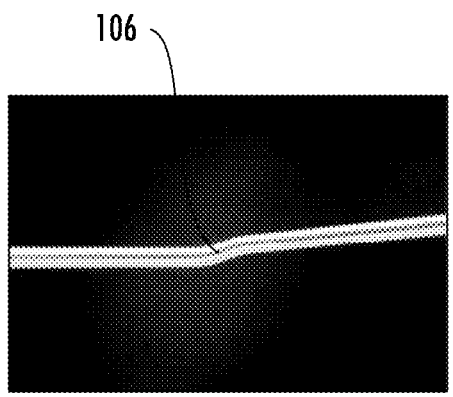
Figure 11C:
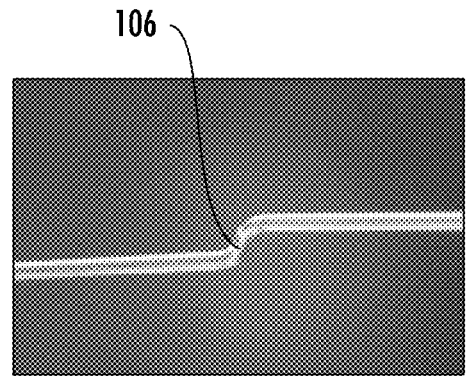

After the optical fiber 18 is mounted in the ferrule 36, a majority of the eccentric bulge 106 may be removed from the optical fiber 18 through one of the above-discussed cleaving processes, for example since it may be the case that only the minor asymmetric region 142 of the eccentric bulge is positioned within the ferrule bore 38. Accordingly, in some embodiments, the formation of the eccentric bulge 106 may be relatively crude, thereby reducing costs associated with mounting the optical fiber 18 to the ferrule 36. FIGS. 11A-C provide illustrative examples of varying shaped eccentric bulges 106, which may be achieved by altering one or more of the above-discussed processing parameters.

Referring to FIG. 9, as another example of a variable that may be adjusted, the width or diameter of the ferrule bore 38 may be changed to vary the amount of movement of the fiber core 96 in the crosswise direction D4. For example, as the width or diameter of the ferrule bore 38 is increased, the tight, wedged engagement between the ferrule bore and the major asymmetric region 116 may occur at a larger width or diameter of the major asymmetric region. Accordingly, the amount of movement of the fiber core 96 in the crosswise direction D4 may increase as the width or diameter of the ferrule bore 38 is increased. The above variables or processing parameters are provided for exemplary purposes, and it is possible that other processing parameters or variables may be changed to control the configuration of the eccentric bulge 106 and the associated movement of the fiber core 96.

One example of this disclosure is the provision of a method of at least partially forming an optical interface, wherein the optical interface may comprise the optical fiber 18 and ferrule 36. The method may comprise eccentrically positioning the portion of the fiber core 96 that is within the major and/or minor asymmetric regions 116, 142 in the ferrule bore 38. The major inclined surface 124, which is part of the asymmetric outer surface 132 of the major and/or minor asymmetric regions 116, 142, may be spaced outwardly from the portion of the fiber core 96 that is within the major and/or minor asymmetric regions 116, 142 in a first direction, which may be the crosswise direction D5 (FIG. 9). There may be contact, such as sliding contact, between the major inclined surface 124 and the ferrule 36 so that the core axis 96A (FIG. 10) is spaced apart from the bore axis 38A in a second direction, which may be the crosswise direction D4 (FIG. 9). The first crosswise direction D5 and the second crosswise direction D4 may extend substantially opposite from one another. The bore axis 38A may be spaced apart from a datum point, such as the center point P (FIGS. 3 and 4) in a third direction, which may be the crosswise direction of eccentricity E1 (FIG. 3). The first crosswise direction D5 and the third crosswise direction E1 may be substantially aligned with one another, such as by extending in substantially the same direction. The optical interface may be the fiber optic connector 10, and the first crosswise direction D5 and the third crosswise direction E1 may both be substantially aligned in relation to the housing key 68 (FIG. 3), the ferrule key 78 (FIG. 3), and/or any other suitable predetermined feature, datum or frame of reference of the fiber optic connector 10, or the like.

Some of the methods described above may advantageously be used to tune positions of core axes 96A in ferrule bores 38 prior to fully assembling an associated fiber optic connector 10, or the like. As an example, such pre-tuning seeks to reduce any necessity of partially disassembling fiber optic connectors 10 for tuning purposes, which seeks to reduce risks associated with disassembling and reassembling the fiber optic connectors. As another example, at least some of the methods of tuning described herein may seek to reduce or eliminate any need to illuminate an opposite end of an optical fiber 18 for tuning purposes.

Persons skilled in optical connectivity will appreciate additional variations and modifications of the devices and methods already described. For example, although the optical fibers 18 described above may include a glass core and cladding, in alternative embodiments the core and/or cladding may comprise a plastic material. Additionally, where a method claim below does not explicitly recite a step mentioned in the description above, it should not be assumed that the step is required by the claim. Furthermore, where a method claim below does not actually recite an order to be followed by its steps or an order is otherwise not required based on the claim language, it is not intended that any particular order be inferred.

The above examples are in no way intended to limit the scope of the present invention. It will be understood by those skilled in the art that while the present disclosure has been discussed above with reference to examples of embodiments, various additions, modifications and changes can be made thereto without departing from the spirit and scope of the invention as set forth in the claims.

What is claimed is:

1. A method of at least partially forming an optical interface comprising an optical fiber and a ferrule, the method comprising:
   eccentrically positioning a portion of a core of the optical fiber in a bore of the ferrule, wherein:
     an asymmetric cross-sectional region of the optical fiber includes the portion of the core, and the asymmetric cross-sectional region further includes an asymmetric outer surface,
     the asymmetric outer surface extends asymmetrically around the portion of the core,
     the asymmetric outer surface includes an inclined portion spaced outwardly from the portion of the core in a first direction,
     the eccentrically positioning is comprised of there being contact between the inclined portion and the ferrule, so that a lengthwise axis of the portion of the core is spaced apart from a lengthwise axis of the bore in a second direction, and the first and second directions extend substantially opposite from one another,
     the eccentrically positioning is comprised of causing relative movement between the asymmetric cross-sectional region and the bore along the lengthwise axis of the bore while the optical fiber extends through the bore; and
     the contact between the inclined portion and the ferrule occurs at least partially in response to the relative movement between the asymmetric cross-sectional region and the bore.

2. The method of claim 1, further comprising substantially aligning the first direction with a predetermined feature of the optical interface.

3. The method of claim 2, wherein:
   the optical interface comprises a fiber optic connector; and
   the predetermined feature comprises a key of the fiber optic connector.

4. The method of claim 1, wherein the contact comprises there being sliding contact between the inclined portion and the ferrule, so that the portion of the core moves in the second direction in response to the sliding contact.

5. The method of claim 1, further comprising selecting the first direction to decrease insertion loss associated with the optical interface.

6. The method of claim 1, wherein:
   the lengthwise axis of the bore is spaced apart from a datum point in a third direction; and
   the method further comprises substantially aligning the first and third directions with one another.

7. The method of claim 6, wherein the datum point is a center point of the ferrule.

8. The method of claim 1, further comprising:
   inserting the optical fiber through the bore; and
   at least partially forming the asymmetric cross-sectional region while the optical fiber extends through the bore.

9. The method of claim 8, wherein the at least partially forming of the asymmetric cross-sectional region is comprised of asymmetrically heating the asymmetric cross-sectional region.

10. The method of claim 9, wherein the asymmetrically heating of the asymmetric cross-sectional region is comprised of:
    positioning a pair of electrodes such that a line extending between a tip of each of the pair of electrodes is laterally spaced apart from the portion of the core, and
    operating the electrodes to form at least one electrical arc between the electrodes.

11. The method of claim 1, wherein the causing of the relative movement between the asymmetric cross-sectional region and the bore is comprised of pulling the optical fiber so that the asymmetric cross-sectional region moves at least farther into the bore.

12. The method of claim 1, further comprising positioning the bore of the ferrule within a predetermined tuning region.

13. The method of claim 12, further comprising selecting the first direction so that the portion of the core is positioned in a predetermined target zone after the eccentrically positioning of the portion of the core in the bore, wherein:
    the predetermined target zone is at least partially defined relative to a datum point; and
    the predetermined tuning region is at least partially defined relative to the datum point.

14. The method of claim 12, wherein:
    the lengthwise axis of the bore is spaced apart from a datum point in a third direction; and
    the positioning of the bore of the ferrule within the predetermined tuning region is comprised of substantially aligning the third direction with at least one key, the key being configured for at least indirectly positioning the ferrule.

15. The method of claim 12, further comprising at least partially defining a boundary of the predetermined tuning region so that the predetermined tuning region extends through:
    a distance measured from a datum point, and
    an angle measured from a centerline that intersects the data point.

16. The method of claim 15, wherein:
    the distance is up to about 1.5 μm, and
    the angle is in a range from about negative 45 degrees to about positive 45 degrees.

17. A fiber optic apparatus, comprising:
    an optical fiber comprising a core, wherein:
      an asymmetric cross-sectional region of the optical fiber comprises an asymmetric outer surface and a portion of the core, and
      the asymmetric outer surface extends asymmetrically around the portion of the core, and the asymmetric outer surface includes an inclined portion spaced outwardly from the portion of the core in a first direction; and a ferrule defining a bore in which the asymmetric cross-sectional region is at least partially positioned so that:
the portion of the core is at least partially positioned in the bore, and
the inclined portion is in contact with the ferrule,
wherein at least the bore and the inclined portion are cooperatively configured so that a lengthwise axis of the portion of the core is spaced apart from a lengthwise axis of the bore in a second direction, and the first and second directions extend substantially opposite from one another; and
wherein the lengthwise axis of the bore is spaced apart from a datum point in a third direction, the first and third directions are substantially aligned with one another, and the datum point is a center point defined with respect to an outer circumference of the ferrule.

18. The fiber optic apparatus of claim 17, wherein the first direction is substantially aligned with a predetermined feature of the fiber optic apparatus.

19. The fiber optic apparatus of claim 17, wherein:
the fiber optic apparatus comprises a fiber optic connector; and
predetermined feature comprises a key of the fiber optic connector.

20. The fiber optic apparatus of claim 17, wherein the bore is positioned within a region that extends through:
a distance measured from the datum point, and
an angle measured from a centerline that intersects the datum point.

21. The fiber optic apparatus of claim 20, wherein:
the distance is up to about 1.5 µm, and
the angle is in a range from about negative 45 degrees to about positive 45 degrees.

22. The fiber optic apparatus of claim 17, wherein:
the inclined portion is a first inclined portion;
the asymmetric outer surface includes a second inclined portion positioned oppositely from the first inclined portion; and
the first inclined portion has a greater slope than the second inclined portion.

23. A method of at least partially forming an optical interface comprising an optical fiber and a ferrule, the method comprising:
inserting the optical fiber through a bore of the ferrule;
at least partially forming an asymmetric cross-sectional region of the optical fiber while the optical fiber extends through the bore, wherein the at least partially forming of the asymmetric cross-sectional region is comprised of asymmetrically heating the asymmetric cross-sectional region; and
eccentrically positioning a portion of a core of the optical fiber in the bore of the ferrule, wherein:
an asymmetric cross-sectional region of the optical fiber includes the portion of the core, and the asymmetric cross-sectional region further includes an asymmetric outer surface,
the asymmetric outer surface extends asymmetrically around the portion of the core,
the asymmetric outer surface includes an inclined portion spaced outwardly from the portion of the core in a first direction, and
the eccentrically positioning is comprised of there being contact between the inclined portion and the ferrule, so that a lengthwise axis of the portion of the core is spaced apart from a lengthwise axis of the bore in a second direction, and the first and second directions extend substantially opposite from one another.

24. The method of claim 23, wherein the asymmetrically heating of the asymmetric cross-sectional region is comprised of:
positioning a pair of electrodes such that a line extending between a tip of each of the pair of electrodes is laterally spaced apart from the portion of the core, and
operating the electrodes to form at least one electrical arc between the electrodes.

\* \* \* \* \*